United States Patent
Fick et al.

(10) Patent No.: US 7,101,169 B2
(45) Date of Patent: Sep. 5, 2006

(54) METHOD AND DEVICE FOR PRODUCING POUCH-SHAPED OR POT-SHAPED PARTS AND USE OF THE PARTS FOR ACCOMMODATING SAMPLES OR THE LIKE

(75) Inventors: Juergen Fick, Oberstreu (DE); Frank Deck, Niederkirchen (DE); Michael Fritz, Biblis (DE); Martin Frank, Dirmstein (DE)

(73) Assignee: Preh-Werke GmbH & Co. KG, Bad Neustadt an der Saale (DE)

( * ) Notice: Subject to any disclaimer, the term of this patent is extended or adjusted under 35 U.S.C. 154(b) by 273 days.

(21) Appl. No.: 10/309,039

(22) Filed: Dec. 4, 2002

(65) Prior Publication Data

US 2003/0102601 A1 Jun. 5, 2003

(30) Foreign Application Priority Data

Dec. 4, 2001 (DE) ................ 101 59 462

(51) Int. Cl.
*B29C 33/50* (2006.01)
(52) U.S. Cl. ............... 425/398; 425/417; 425/DIG. 44; 264/313
(58) Field of Classification Search ................ 425/127, 425/128, 129.2, 412, 417, DIG. 44, 193, 425/195, 345, 353, 398; 72/57, 60–62, 465.1; 264/313
See application file for complete search history.

(56) References Cited

U.S. PATENT DOCUMENTS

| | | | | |
|---|---|---|---|---|
| 3,958,910 A | * | 5/1976 | Wilde .......................... 425/127 |
| 4,398,875 A | * | 8/1983 | Kawashima et al. ........ 425/127 |
| 4,497,765 A | * | 2/1985 | Wilde et al. ................. 425/127 |
| 4,689,979 A | * | 9/1987 | Otsuka et al. .................. 72/57 |
| 4,927,480 A | * | 5/1990 | Vaughan ...................... 156/228 |
| 5,016,458 A | * | 5/1991 | De Smet ........................ 72/57 |
| 5,332,381 A | * | 7/1994 | Shapcott ..................... 425/127 |
| 5,490,407 A | * | 2/1996 | Doose ............................ 72/57 |
| 6,029,486 A | * | 2/2000 | Haraga et al. ............. 72/465.1 |

FOREIGN PATENT DOCUMENTS

| | | |
|---|---|---|
| DE | 584 365 7 C | 9/1933 |
| DE | 38 40 080 A1 | 5/1990 |
| DE | 39 25 746 A1 | 2/1991 |
| DE | 92 03 598.1 B65D | 6/1992 |
| DE | 695 13 409 T2 | 3/1996 |
| DE | 197 06 797 A1 | 8/1998 |

* cited by examiner

*Primary Examiner*—Duane Smith
*Assistant Examiner*—Thu Khanh T. Nguyen
(74) *Attorney, Agent, or Firm*—McGrath, Geissler, Olds & Richardson, PLLC

(57) ABSTRACT

The production of pouch-shaped or pot-shaped parts is undertaken in two steps. In the first step, a film located above a die is pressed by a stamp into a cavity that reproduces the part and is subsequently pressed apart in the lower region of the cavity by deformation of the stamp in this region. The device has a rubber-like stamp that expands out on all sides once it has reached the bottom wall of the cavity and causes the film to conform to the shape of the cavity. The stamp is preferably designed in two parts, wherein a stamp insert is guided within a stamp guide and the stamp insert then has at least one deformable region. For removal of the formed film, provision is made that the die can be swung open.

6 Claims, 3 Drawing Sheets

METHOD AND DEVICE FOR PRODUCING POUCH-SHAPED OR POT-SHAPED PARTS AND USE OF THE PARTS FOR ACCOMMODATING SAMPLES OR THE LIKE

This nonprovisional application claims priority under 35 U.S.C. § 119(a) on German Patent Application No. 101 59 462.3 filed in Germany on Dec. 4, 2001, which is herein incorporated by reference.

BACKGROUND OF THE INVENTION

For nearly daily monitoring of, for example, a patient's blood sugar levels, the patient has a portable diagnostic unit or system. In addition to such a unit, an analytical indicator strip with an orientation index, which must be fed to the diagnostic unit by hand, is known from DE 695 13 409 T2.

Conventional indicator strips, which must be separately fed, are unsuitable in the general effort to make execution of the overall diagnostic process automatic and patient-friendly, i.e., without additional effort on the part of the patient.

Consideration has been given to replacing the indicator strips with well-like or pouch-shaped receptacles, which are made of plastic or a similar material in which a non-woven, spun-bonded fabric required for the analysis is embedded to keep it from falling out.

DE 38 40 080 A1 discloses a packaging for small items in the form of a blister, wherein the blister consists of a deep-drawn film having wells to accommodate the individual items. In this context, it would be necessary for the film to be glued in place, for example, to keep it from falling out, which can be a disadvantage for analytical evaluation. For pouch-shaped or pot-shaped receptacles or the like, which have a narrower inlet cross-section than in the lower (receptacle) section itself, such a process cannot be used.

SUMMARY OF THE INVENTION

It is therefore an object of the present invention to provide a method and a device for producing pouch-shaped or pot-shaped parts, having a die with a cavity that reproduces the part, and also having a stamp, wherein the stamp has a deformable material at least in the forward region.

Pot- or pouch-shaped parts have the characteristic that they have a first, narrower cross-section that adjoins a wider lower region. A die required for these parts is constructed accordingly.

The invention is based on the concept of producing these parts in two steps, wherein in the first step, a film located above the die is pressed by a stamp into or through the narrow cross-section, and subsequently is pressed apart in the lower region by deformation of the stamp in this region, thus conforming to the wider lower region of the die.

As such, the device has a rubber-like pressure stamp that expands out to all sides in the wider lower region of the die once it has reached the bottom wall or floor of the die. For removal of the formed film, provision is made that the die itself can be swung open.

In a further embodiment of the invention, the stamp is designed in two parts, wherein it has a stamp insert that is guided within a stamp guide. In this case, the stamp insert then has the deformable material at least in its forward region.

By this solution, even small-dimensioned pouches can be produced that are made of very thin film material and have a small (first) diameter.

Such pouches or receptacles can particularly be used in medical diagnostics.

Since the present invention, however, is not limited to this miniaturization, its use is also intended for other areas in which convex pouches, produced in such a manner, are required.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
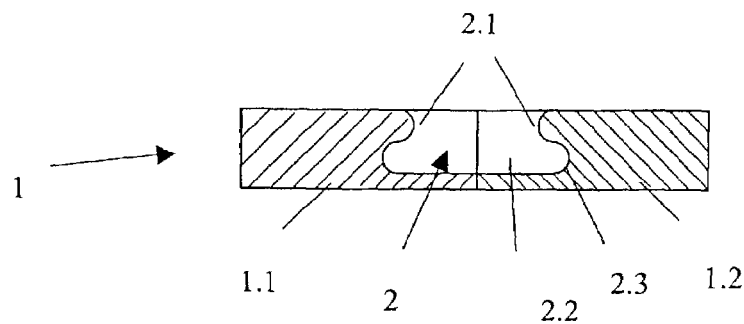
FIG. 1 is a cross-section of a pouch-shaped die that reproduces one of the receptacles.

FIG. 1 shows a die 1 with a pouch-shaped cavity 2. The die 1 is part of a device (not shown in detail) that has preferably a pneumatically driven stamp 3.

The die 1 comprises two blocks 1.1 and 1.2 that are separable from one another, preferably in the middle. The pouch-shaped cavity 2 accurately reproduces the contours of a to be produced part 10, and has a narrow inlet cross-section 2.1 and a wider lower region 2.2 that is formed by a side wall 2.3.

Figure 2A:
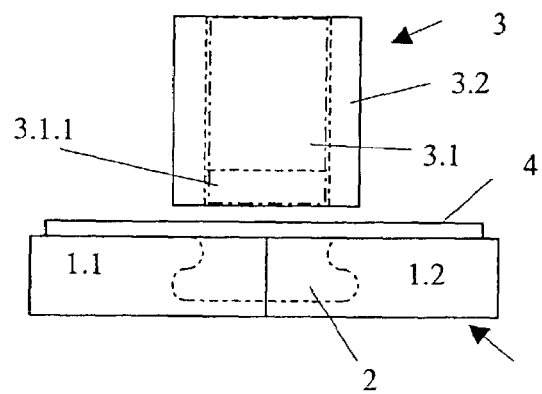
FIGS. 2a–c show the die of FIG. 1, interacting with a stamp.
Figure 2B:
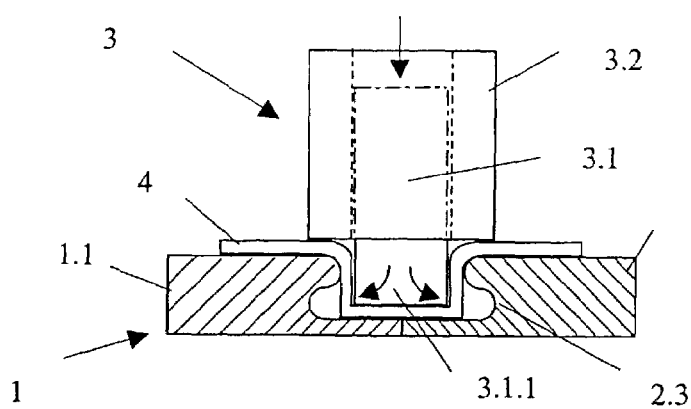
Figure 2C:
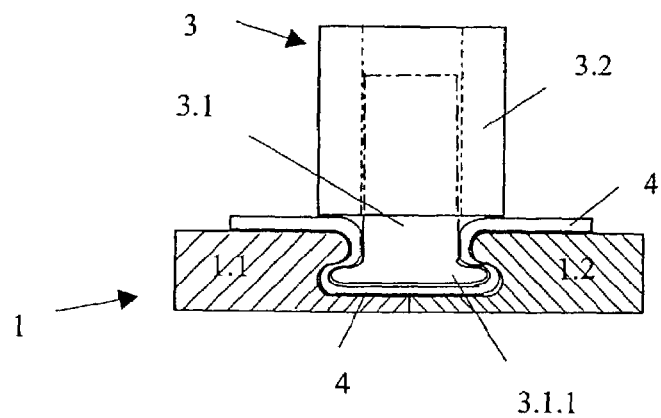

The method is described in detail using the process steps shown in FIGS. 2a through 2c.

The stamp 3 comprises, in a preferred embodiment, an inner stamp insert 3.1, which is preferably guided in a metallic stamp guide 3.2. The stamp insert 3.1 comprises a deformable, preferably rubber-like material, at least in the forward region 3.1.1.

The stamp 3 is placed over the die 1 (FIG. 2a) on a thin film 4, for example a plastic film, which is to be pressed into the cavity 2 of the die 1. The plastic film 4, here a polyester or polycarbonate that is approximately 100 μm thick (D), is then pressed into the inlet cross-section 2.1, in the direction of the cavity 2 (FIG. 2b), by the further application of pressure solely to the stamp insert 3.1. During this process, the outer edge region 11 of the film 4 molds itself to the contour of the inlet cross-section 2.1. The diameter of the stamp insert 3.1 is thus matched to the inlet cross-section 2.1 while taking the film thickness D into account.

As a result of the further action of force on the stamp insert 3.1, the forward region 3.1.1 of the stamp insert 3.1 is deformed such that it presses the film 4 against the wall 2.3 in the previously empty space in the lower region 2.2. The part 10 has thus attained its pouch-shaped or pot-shaped form.

Figure 3A:
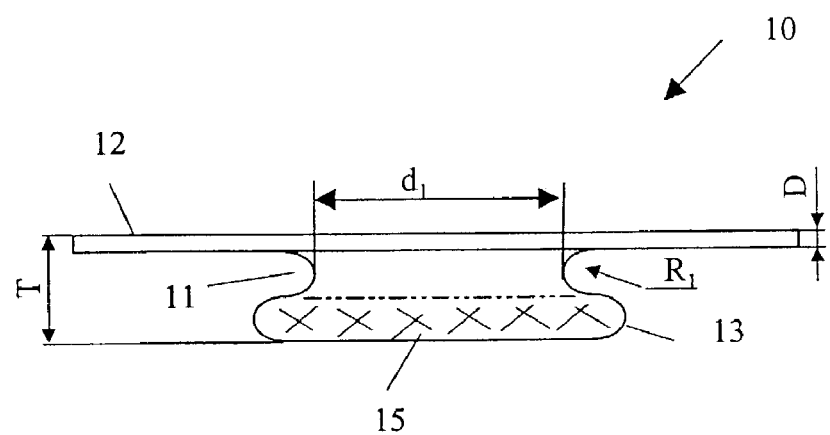
FIG. 3a is an enlarged side view of a pouch-shaped receptacle for a sample.
Figure 3B:
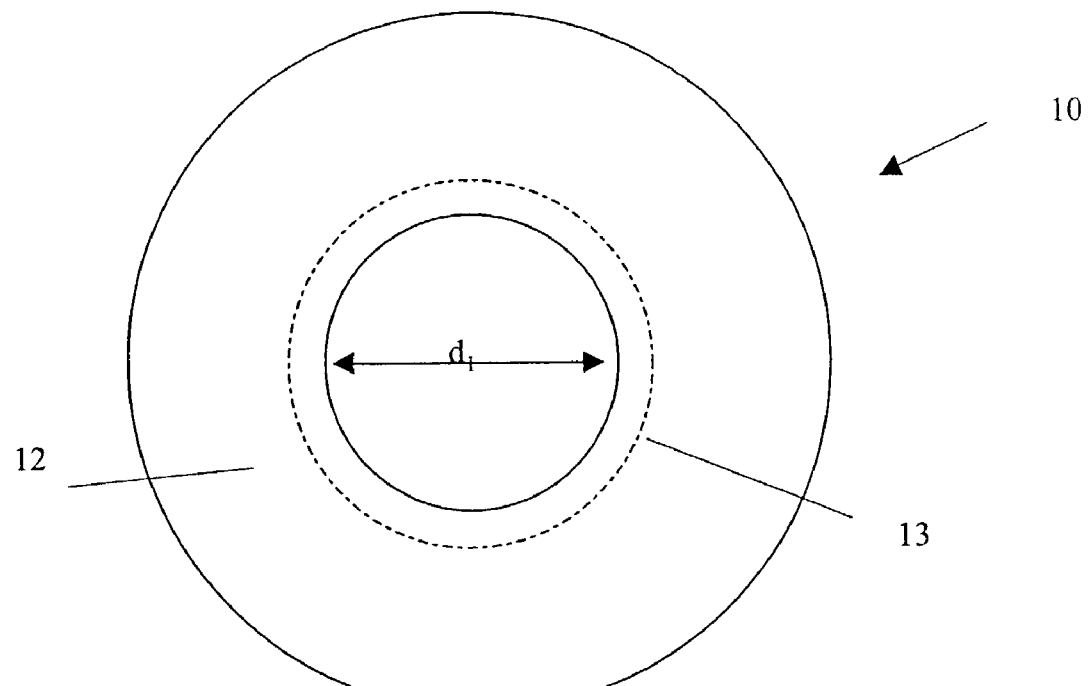
FIG. 3b is an enlarged top view of a pouch-shaped receptacle for a sample.

FIGS. 3a and 3b show a side view and a top view of a part 10 that has been manufactured in this manner. The pouch-shaped part 10 has an edge 12 and a pouch-like convexity 13. Between the edge 12 and the convexity 13, the outer edge region 11 has a radius $R_1$, which in this embodiment is less than 90°, for example 85°. A radius $R_1$ of less than 180° is also conceivable. For this purpose, for example, a larger deformation region 3.1.1 should be provided on the die insert 3.1.

The ratio of the depth T of the part 10 to its own diameter $d_1$, and thus to the inlet cross-section 2.1 of the cavity 2, is preferably 1:1. The depth T of the manufactured part 10 can thus be less than 0.5 mm, or can be larger.

Such a part 10 can be used as a receptacle or pouch in medical diagnostics. A non-woven, spun-bonded fabric 15, that is located in the part or the pouch 10 and can accommodate a sample (not shown in detail), is indicated only schematically.

The solution, however, is not limited to such small parts 10.

Figure 4:
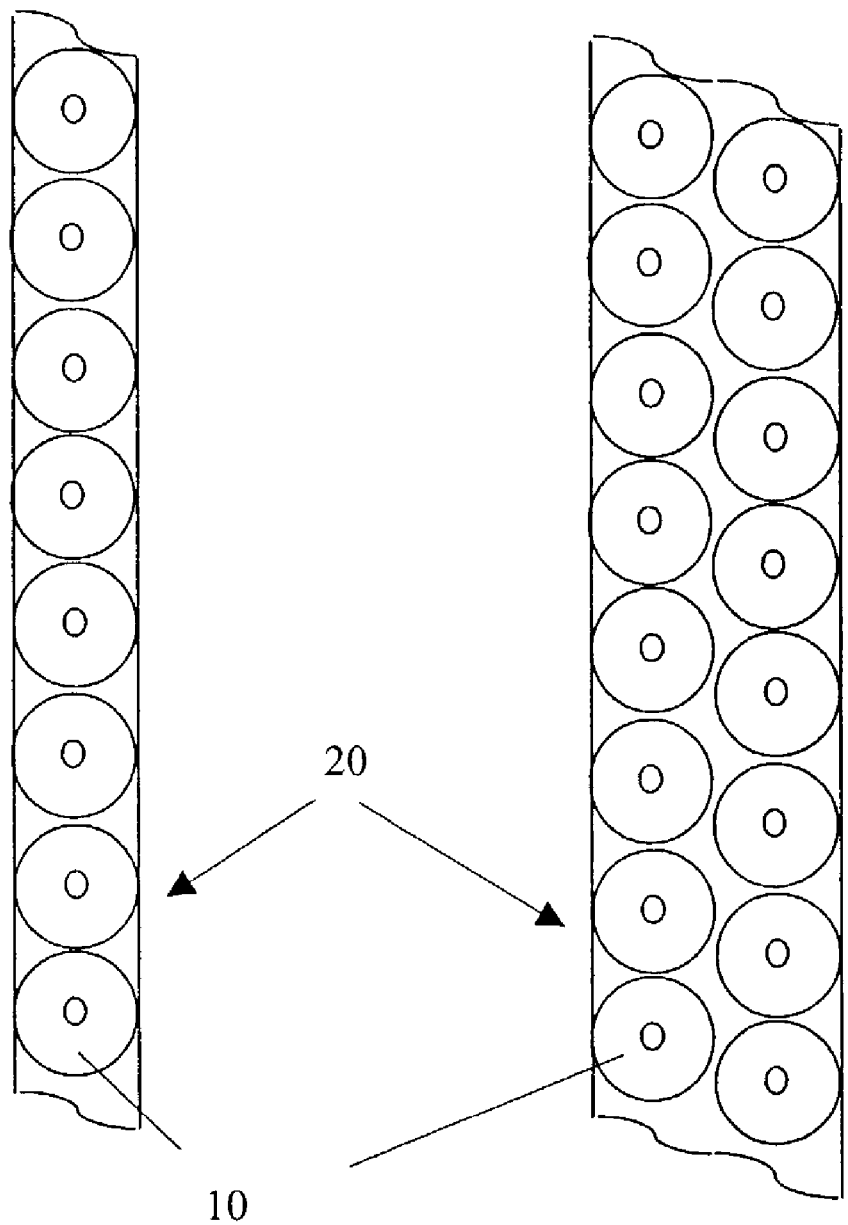
FIG. 4 is a top view of several manufactured receptacles for multiple samples.

FIG. 4 shows a complete single-row or double-row film 20 with multiple pouch-like parts 10. Here, too, the solution is not limited to the embodiments shown. Thus, the manufacture of complete films 20 with three or more rows is possible. To this end, the film 20 can be transported under the stamp 3, or the device can have multiple stamps 3 (not shown in detail).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for producing pouch-shaped parts, the device comprising:
    a die having a cavity for producing the pouch-shaped part, the cavity having a diameter that is greater than an opening of the cavity; and
    a stamp having a deformable material at least in a forward region,
    wherein the deformable material deforms itself to substantially contour the cavity.

2. The device according to claim 1, wherein the stamp further comprises a stamp insert that is guided within a stamp sleeve, wherein the stamp insert contains the deformable material in the forward region.

3. The device according to claim 1, wherein the deformable material is rubber.

4. The device according to claim 3, wherein the deformable material is an elastomer.

5. The device according to claim 1, wherein the pouch-shaped part is a receptacle for samples or fluids.

6. The device according to claim 1, wherein the pouch-shaped part is a medical diagnostic pouch-shaped part, which is formed so as to contain therein a non-woven, spun-bonded fabric.

* * * * *

UNITED STATES PATENT AND TRADEMARK OFFICE
CERTIFICATE OF CORRECTION

PATENT NO. : 7,101,169 B2
APPLICATION NO. : 10/309039
DATED : September 5, 2006
INVENTOR(S) : Fick It is certified that error appears in the above-identified patent and that said Letters Patent is hereby corrected as shown below:

Please Change:

"(75) Inventors: Juergen Fick, Oberstreu (DE);
Frank Deck, Niederkirchen (DE);
Michael Fritz, Biblis (DE);
Martin Frank, Dirmstein (DE)"

To:

--(75) Inventors: Juergen Fick, Oberstreu (DE)--

Signed and Sealed this

Twenty-first Day of November, 2006

JON W. DUDAS
*Director of the United States Patent and Trademark Office*